Patented July 14, 1925.

1,545,559

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

POROUS REFRACTORY ARTICLE AND METHOD OF MAKING THE SAME.

No Drawing. Application filed September 22, 1923. Serial No. 664,294.

*To all whom it may concern:*

Be it known that I, MINER L. HARTMANN, a citizen of the United States, residing at Niagara Falls, county of Niagara, and State of New York, have invented a new and useful Improvement in Porous Refractory Articles and Methods of Making the Same, of which the following is a full, clear, and exact description.

The present invention relates broadly to improved porous refractory articles and method of making the same, and more particularly to thermal insulating ceramic articles. An object of the invention is to produce high temperature heat-insulating bodies of increased thermal resistance, refractoriness and mechanical strength.

It is well recognized that fireclay bricks are moderately efficient thermal insulators, and that this property depends largely upon the amount of closed pore spaces within the body. It is also known that the porosity of a given refractory may be increased by adding a material which, during the burning process used in making the brick, is removed by oxidation. The improved process herein described permits the introduction of much more pore space than it has hitherto been possible to attain by the methods now known and in use.

The preferred method of carrying out my invention consists in mixing an unburned refractory mixture containing inert particles and a binder with a high percentage of an oxidizable or volatile organic filler, such for example as a finely ground wood flour, cork dust, or the like. The mass so produced is then fired to calcine or vitrify it and to remove the organic filler. The porous grog containing an inert material thus formed has a crystalline structure with voids between the crystals left after the burning out of the filler. It is then crushed to suitable fineness, mixed with smaller portions of additional binder and an additional amount of the organic filler, shaped as desired and refired to consolidate or vitrify it into a body sufficiently strong for the desired purpose for which it is to be used.

As one illustration of a method of practicing my invention, I will describe the method which I have successfully used for making highly refractory insulating bricks. A thick paste or mud with water was made of a mixture of two parts by weight of kaolin clay, two parts by weight of silicon carbide grains and one part by weight of an organic filler, such as wood flour. After very thorough mixing, this material was formed into convenient sized blocks and burned in a suitable furnace, for example, a kiln, until the organic filler was removed and vitrification or sintering had occurred in the clay. After cooling, this porous grog was crushed to run of mill, 14 mesh and finer, thereby forming previously burned porous aggregates.

Four parts by weight of these porous aggregates were then mixed with one part raw kaolin clay and one part wood flour, together with sufficient water to form a suitable mass for molding into shapes in the well known manner of firebrick manufacture. After thorough drying, the shaped pieces were burned in a kiln, or furnace, until the required vitrification and strength were attained.

By the use of my improved method, it is possible to produce fireclay bricks having a porosity of 75% by volume, and of thermal conductivity less than one-half that of ordinary firebrick. I have been able also to make bricks of light weight whose crushing strength at 1350 degrees C. exceeds 25 pounds per square inch.

Another marked advantage of refractories made by this process is their light weight, which is an important property in bricks used for marine and locomotive type boiler furnaces.

While I have herein described my process by its application to the making of fireclay carborundum bricks, it will be understood that this description is by way of illustration only and not for the purpose of limiting my invention, the invention being equally applicable to other refractory materials, such as silica, alumina, sillimanite, magnesium, aluminate, fused or partly fused kaolin, etc., and suitable binding agents for these inert materials.

I claim:

1. A porous refractory article, containing previously burned porous crystalline aggregates.

2. A porous refractory article, comprising previously burned porous aggregates, said aggregates containing an inert material and a binder.

3. A porous refractory article, comprising previously burned porous aggregates, said aggregates containing an inert material and a vitrifiable binder.

4. A porous refractory article, containing crushed porous crystalline particles of a previously burned refractory mass.

5. A porous refractory article, containing previously burned porous crystalline aggregates bonded by a vitrified clay.

6. A fired refractory material, comprising porous aggregates containing an inert material and a binder.

7. A fired refractory material, comprising porous aggregates containing an inert material and a vitrified binder.

8. The method of making porous refractory material, comprising calcining a mixture containing inert particles, a vitrifiable binder and an oxidizable filler.

9. The method of making porous refractory articles, comprising calcining a mixture containing inert particles, a vitrifiable binder and a volatile filler, crushing the porous mass, mixing with additional volatile filler and raw binder, shaping, and firing.

10. The method of making porous refractory articles, comprising calcining a mixture containing clay and a volatile and oxidizable filler, crushing the porous mass so formed, mixing with additional volatile and oxidizable filler and raw binder, shaping, and firing.

11. The method of making porous refractory articles, comprising calcining a mixture containing clay and fine wood flour, crushing the porous mass, mixing with additional fine wood flour and raw clay, shaping, and firing.

12. The method of making porous refractory articles, comprising calcining a mixture containing clay and wood flour, crushing the porous mass, mixing with additional wood flour and raw clay, shaping, and firing.

In testimony whereof I have hereunto set my hand.

MINER L. HARTMANN.